(12) United States Patent
Buskirk

(10) Patent No.: US 9,508,479 B1
(45) Date of Patent: Nov. 29, 2016

(54) METHOD FOR IN-SITU MAGNETIZATION OR DEGAUSSING OF GENERATOR ROTOR

(71) Applicant: General Electric Company, Schenectady, NY (US)

(72) Inventor: Eric Steven Buskirk, Scotia, NY (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 14/744,754

(22) Filed: Jun. 19, 2015

(51) Int. Cl.
*H01F 13/00* (2006.01)

(52) U.S. Cl.
CPC .......... *H01F 13/003* (2013.01); *H01F 13/006* (2013.01)

(58) Field of Classification Search
CPC ....................................................... H01F 13/00
USPC ......................................................... 335/284
See application file for complete search history.

(56) References Cited

U.S. PATENT DOCUMENTS

| 5,663,605 A | 9/1997 | Evans et al. |
| 6,236,134 B1 | 5/2001 | Syverson |
| 6,509,664 B2 | 1/2003 | Shah et al. |
| 6,548,931 B2 | 4/2003 | Liang et al. |
| 2010/0207480 A1 | 8/2010 | Reutlinger |

*Primary Examiner* — Ramon M Barrera
(74) *Attorney, Agent, or Firm* — James W. Pemrick; Ernest G. Cusick; Frank A. Landgraff

(57) ABSTRACT

A method for in-situ magnetization of a generator rotor is provided. The generator has a stator and the rotor is located inside the stator. An air gap is formed between an outer radial portion of the rotor and an inner radial portion of the stator. The rotor has a plurality of excitation windings and a plurality of permanent magnets. The method includes the step of applying a current to the excitation windings, and the current is greater than a normal excitation current. A maintaining step maintains the current for a time period sufficient to magnetize the permanent magnets. The magnetization of the permanent magnets occurs on the rotor in-situ and while the rotor is inside the stator.

20 Claims, 4 Drawing Sheets

METHOD FOR IN-SITU MAGNETIZATION OR DEGAUSSING OF GENERATOR ROTOR

BACKGROUND OF THE INVENTION

The method described herein relates generally to in-situ magnetization and degaussing of generator rotors. More specifically, the apparatus relates to in-situ magnetization and degaussing of rotors incorporating permanent magnets.

Most synchronous machines include either permanent magnets or excitation windings (fed by a regulated source) to provide MMF (magnetomotive force) that provides the magnetic flux for machine operation. The permanent magnets or excitation windings can be situated on either the rotor or the stator. For rotor-based embodiments, excitation power is brought through either a set of collectors (slip rings) or a brushless system that uses a small ("inside-out") synchronous machine with a stator excitation source.

Permanent magnet machines are not easily regulated. Operation of permanent magnet machines in constant power mode can be a problem because low power factor operation is forced through flux weakening methods to reduce voltage at light loads or to minimize inverter ratings. As a result, the machine terminal voltage becomes load dependent, efficiency suffers, and, at partial loads, the magnetic field source is underutilized.

Machines wound with excitation windings ("wound field machines") can be regulated over a wide range of loads, but wound field machines experience winding losses that decrease machine efficiency. Additionally, windings and excitation sources for wound field machines are sized to support the maximum requirements and thus are often expensive and under-utilized.

Some known generators combine the advantages of the excitation control of wound field machines and the advantages of higher efficiency of permanent magnet machines. A hybrid machine comprises a cylindrical element having slots, excitation windings situated in at least some of the slots, and permanent magnets situated at the poles. For example, U.S. Pat. No. 6,509,664 describes a hybrid synchronous machine with a field/rotor having excitation windings is some of the slots and permanent magnets at the poles, and this patent is incorporated herein by reference.

BRIEF DESCRIPTION OF THE INVENTION

In an aspect of the present invention, a method for in-situ magnetization of a generator rotor is provided. The generator has a stator and the rotor is located inside the stator. An air gap is formed between an outer radial portion of the rotor and an inner radial portion of the stator. The rotor has a plurality of excitation windings and a plurality of permanent magnets. The method includes the step of applying a current to the excitation windings, and the current is greater than a normal excitation current. A maintaining step maintains the current for a time period sufficient to magnetize the permanent magnets. The maintaining step may utilize a decaying step function to progressively lower the current over time. The magnetization of the permanent magnets occurs on the rotor in-situ and while the rotor is inside the stator.

In another aspect of the present invention, a method for in-situ magnetization of a generator rotor is provided. The generator has a stator and the rotor is located inside the stator. The stator has a plurality of stator windings, and an air gap is formed between an outer radial portion of the rotor and an inner radial portion of the stator. The rotor has a plurality of excitation windings and a plurality of permanent magnets. The method includes a step of applying a current to the stator windings. The current is greater than a normal stator winding current. A maintaining step maintains the current for a time period sufficient to magnetize the permanent magnets in the rotor. The maintaining step may utilize a decaying step function to progressively lower the current over time. The magnetization of the permanent magnets occurs on the rotor in-situ and while the rotor is inside the stator.

In yet another aspect of the present invention, a method for in-situ magnetization or degaussing of a generator rotor is provided. The generator has a stator and the rotor is located inside the stator. The stator has a plurality of stator windings. An air gap is formed between an outer radial portion of the rotor and an inner radial portion of the stator. The rotor has a plurality of excitation windings and a plurality of permanent magnets. The method includes applying a voltage/current to a plurality of windings, and an absolute value of the voltage/current is greater than a normal winding voltage/current. A maintaining step maintains the voltage/current for a time period sufficient to magnetize or degauss the permanent magnets in the rotor. The maintaining step may utilize a decaying step function to progressively lower the current over time, and the current may alternate between positive and negative values. The magnetization or degaussing of the permanent magnets occurs on the rotor in-situ and while the rotor is inside the stator.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of fabrication and manufacture for those of ordinary skill having the benefit of this disclosure.

When introducing elements of various embodiments of the present invention, the articles "a", "an" and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
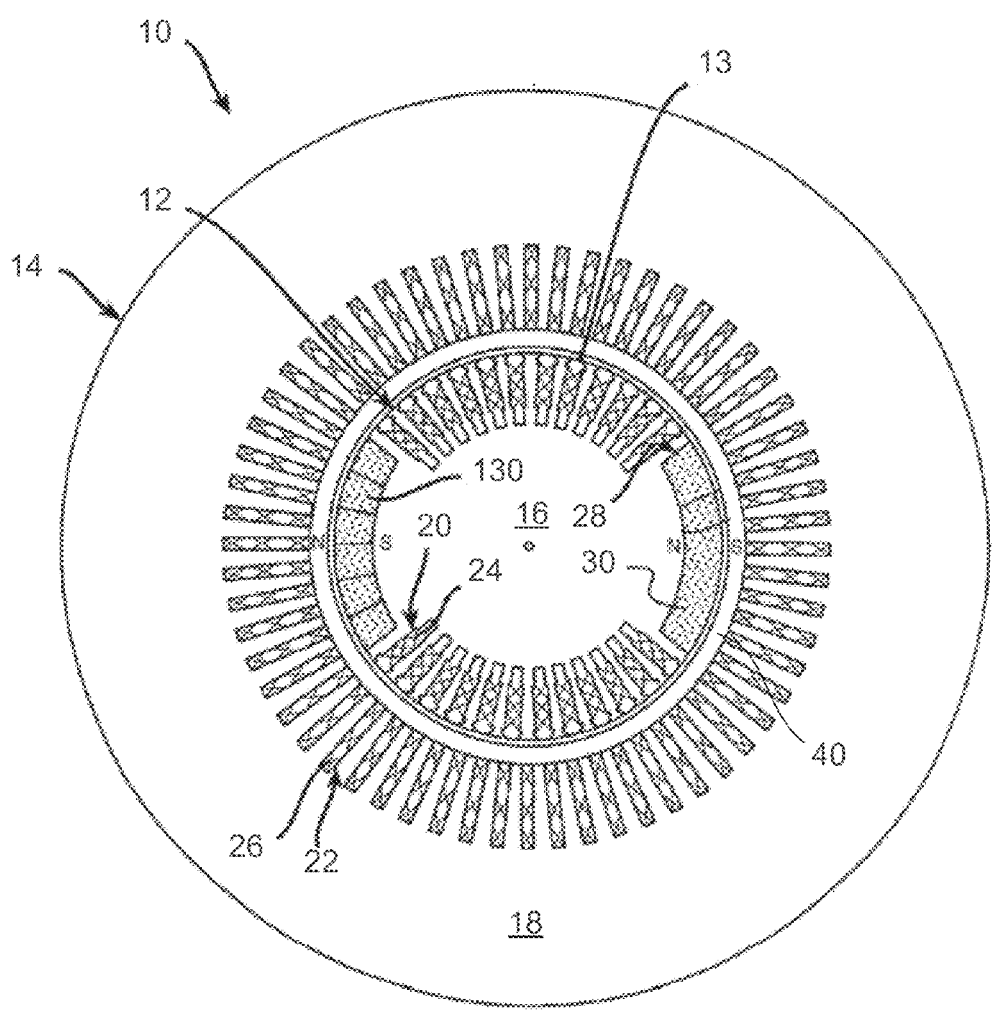
FIG. 1 illustrates a sectional view of one known hybrid synchronous machine, such as a generator.

FIG. 1 is a sectional view of one known hybrid synchronous machine. The hybrid synchronous machine 10 includes a rotor 12 and stator 14. The stator includes a stator core 18 and the rotor includes a rotor core 16. The rotor 12 is shown inside the stator 14, or in the machine's in-situ state. An air gap 40 is formed between an outer radial portion of rotor 12 and an inner radial portion of stator 14. The rotor (or field) slots include winding/excitation slots 20 and permanent magnets 28. Each permanent magnet can be situated in a respective individual one of the permanent magnet slots/location as shown by permanent magnet 30 or a plurality of permanent magnets can situated in a respective one of the magnet slots/location as shown by permanent magnets 130. Although a two pole machine is shown for purposes of simplicity, the method of the present invention additionally extends to machines having more than two poles.

The stator 14 comprises magnetic steel laminations, rotor 12 comprises a solid forging of high strength magnetic steel, permanent magnets 30 or 130 comprise neodymium-iron-boron or samarium-cobalt, for example, and the rotor excitation windings 24 and stator windings 26 comprise insulated copper conductors. The depth and width of the rotor slots and stator slots 22 for the windings and/or permanent magnets will vary according to motor/generator technical constraints. Typically the permanent magnets 30, 130 will extend along the entire or a substantial portion of the axial length of the rotor. An advantage to having the permanent magnets extend to a portion of the rotor that does not extend to the entire length is that magnet flux is directed straight from the rotor to the stator and does not extend along the fringes in the same manner that occurs with rotor end windings. Thus the two-dimensional flux from the rotor to the stator can be increased and the fringe end flux can be decreased.

The permanent magnets in FIG. 1 are situated on the pole or the direct axis of machine 10. Machine 10 may be a generator or a motor. In one embodiment, the permanent magnets 30, 130 are attached to the rotor core with an adhesive such as an epoxy and the windings are applied using a conventional winding technique. Then the rotor is wrapped with a metallic or non-metallic, non-magnetic shell 13 which may comprise carbon, for example. In one embodiment, a non-magnetic shell is applied in a carbon fiber-epoxy composite form.

The use of permanent magnets in generators or motors is not new. However, using them makes handling, assembly and operation of the machine more difficult. In a typical DC excited field/rotor (containing no permanent magnets) when the field current is removed, the magnetic field is removed. In a permanent magnet machine, the magnetic flux cannot be turned off. This creates handling difficulties for the rotor, as well as a potentially hazardous work environment. The rotor will attract (very strongly) magnetic tools and tooling. Trying to insert a permanent magnet rotor into a stator is also very difficult, as the rotor will want to be attracted to one side of the inner radius of the stator. The same difficulties and dangers present themselves when trying to remove a permanent magnet rotor from the stator.

According to the present invention a method is provided for magnetizing and degaussing a permanent magnet containing field/rotor in-situ to facilitate handling thereof. The permanent magnets can be magnetized by using the excitation windings 24 or the stator windings 26. A strong yet short duration current from positive voltage is passed through the windings to create a very large magnetic field. This magnetic field magnetizes the permanent magnets, and the permanent magnets will retain this magnetization until acted on by an opposite magnetic field or increased temperature beyond a predetermined limit. In like manner, the permanent magnets can be degaussed (un-magnetized) by using the excitation windings 24 or the stator windings 26. Degaussing is the process of decreasing or eliminating a remnant magnetic field. A strong yet short duration current from negative voltage is passed through the windings to create a very large magnetic field. This degaussing process "reverses" the magnetizing process and greatly reduces (or possibly eliminates) the magnetization of the permanent magnets. The degaussed permanent magnets make the rotor much easier and safer to handle. Both the magnetizing and degaussing methods are performed in-situ or with the rotor inside of the stator, as the rotor is safely secured in this state. Degaussing (or magnetizing) may also be performed by using multiple decaying steps that may switch from progressively lower positive to negative current over time.

Figure 2:
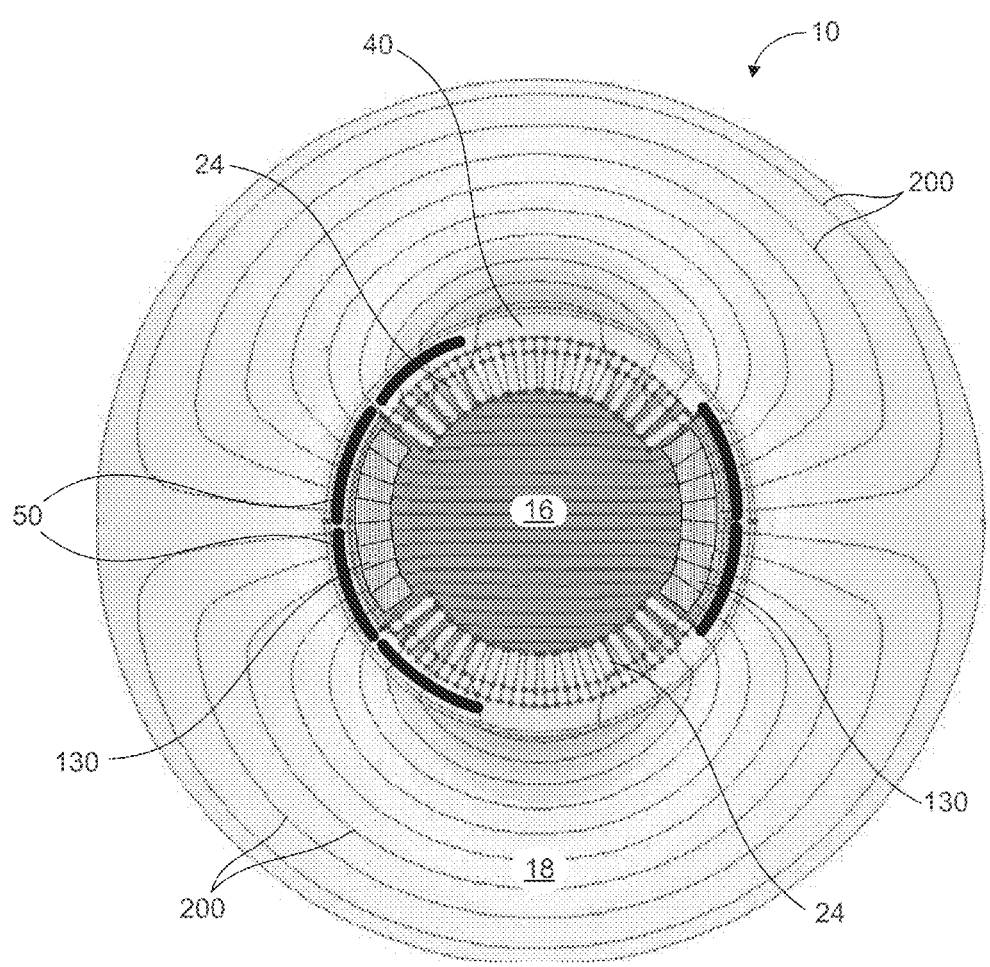
FIG. 2 illustrates the magnetic flux patterns created during a permanent magnet magnetization or degaussing process, according to an aspect of the present invention.

FIG. 2 illustrates the magnetic flux patterns created during a permanent magnet 130 magnetization or degaussing process. The machine 10 is similarly constructed as to the machine shown in FIG. 1, but the stator windings 26 are omitted for clarity. A current is passed through the rotor's excitation windings 24. This current creates a magnetic field illustrated by the lines of magnetic flux 200. As one example only, the machine is a model GE GEN-H53 generator manufactured by the General Electric Company, Schenectady, N.Y. The exciter system for this generator can put out a maximum of about 3,000 amps/1,000 volts (continuous) or about 6,000 amps/2,000 volts for short durations (e.g., up to about 10 seconds). The typical rated rotor winding current/voltage is about 2,000 amps/700 volts. At the maximum allowed voltage/current for the excitation windings 24 it would take about 6 seconds to magnetize (or degauss) the permanent magnets 130. A short burst of high voltage and current will be tolerated by the machines electrical systems and will provide a strong enough magnetic field for in-situ magnetization or degaussing. To magnetize the permanent magnets 130 a positive voltage/current may be used, and to degauss the permanent magnets 130 a negative voltage/current would be used. Alternatively, magnetizing may be accomplished with a negative voltage/current, and degaussing with a positive voltage/current. An important aspect is that the polarity of the voltage/current passing through the windings is reversed for the magnetizing and degaussing operations.

The stator windings 26 may also be used to magnetize or degauss the permanent magnets in the rotor. The process is the same as described above, except that the high intensity and short duration voltage/current is applied to the stator windings 26. The current passing through the stator windings 26 will create a similar magnetic field (compared with flux lines 200) that will either magnetize or degauss the permanent magnets (depending on polarity). In addition, the voltage/current passing through either the rotor or stator windings may be configured as an increasing or decreasing step function. In this embodiment the voltage/current is ramped up or down in a stepped fashion. If the temperature of the permanent magnets is raised to a predetermined level, then the magnetization/degaussing operations may be facilitated.

Figure 3:
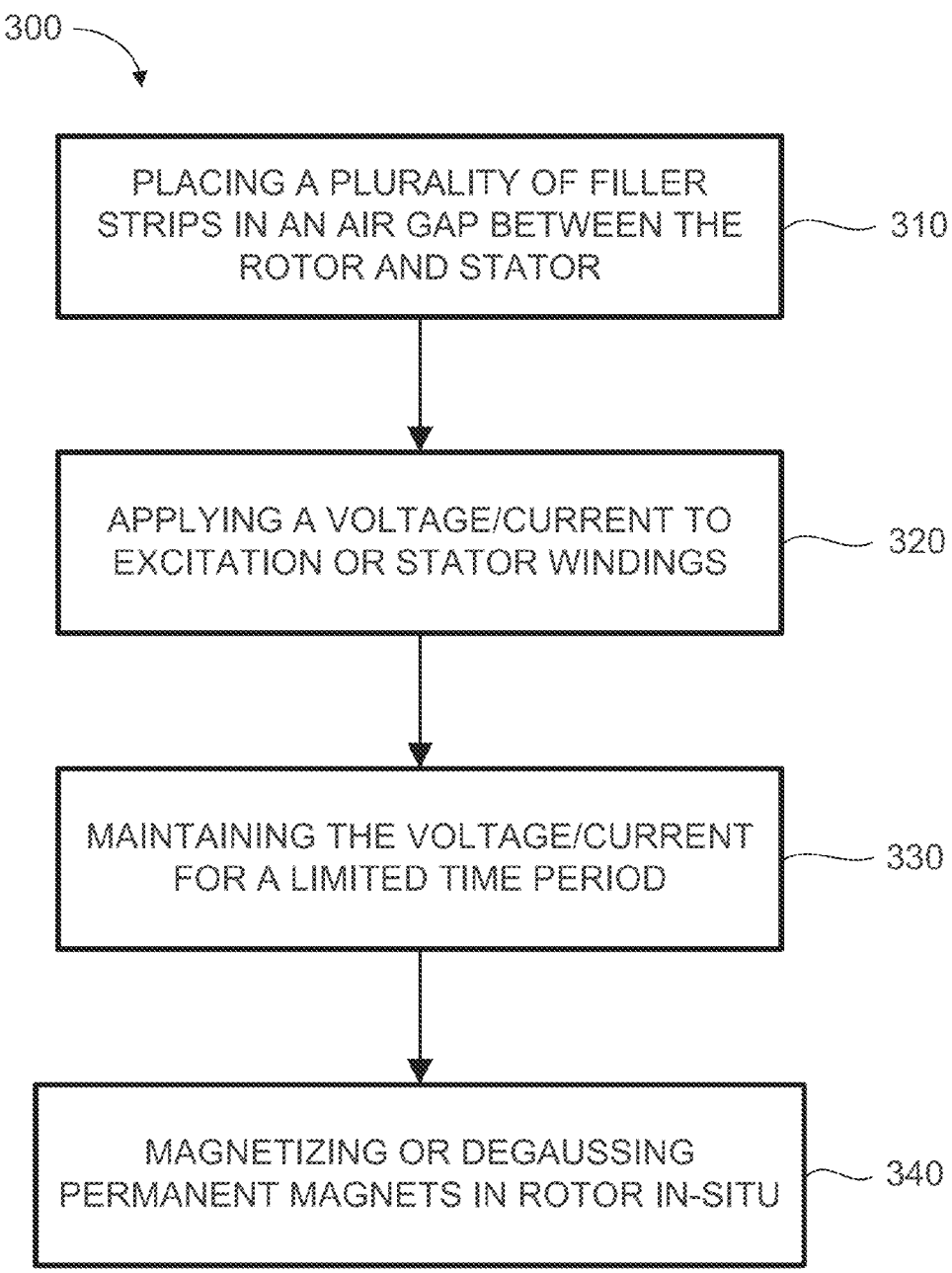
FIG. 3 is a flowchart of a method for in-situ magnetization or degaussing of permanent magnets in a machine's rotor, according to an aspect of the present invention.
Figure 4:
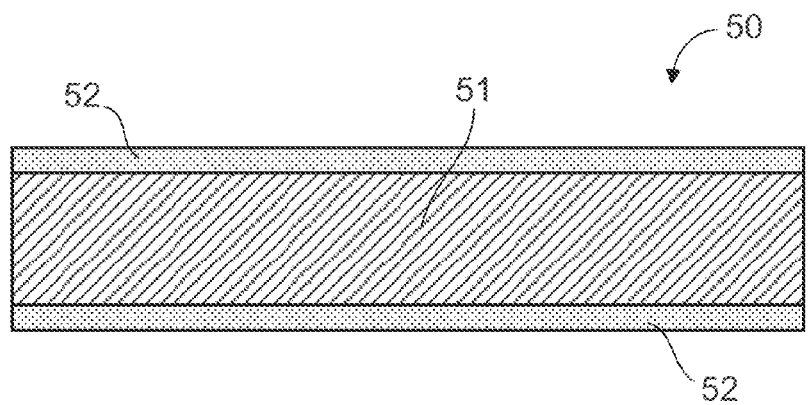
FIG. 4 illustrates a cross sectional view of a filler piece, according to an aspect of the present invention.

FIG. 3 is a flowchart of a method 300 for in-situ magnetization or degaussing of permanent magnets in a machine's rotor. As described previously, the machine may be a generator or a motor. As an option, step 310 may be used to place a plurality of filler pieces 50 in the air gap 40 between the rotor 12 and stator 14. Only a few filler pieces 50 are shown for clarity, and it is to be understood that one or more filler pieces could be used. FIG. 4 illustrates a cross sectional view of a filler piece 50, according to an aspect of the present invention. The filler pieces 50 are configured to reduce reluctance and to permit increased magnetic flux densities. The filler pieces 50 may be comprised of a high magnetically permeable material with a high saturation level. As non-limiting examples only, a cobalt-iron alloy or an iron-cobalt-vanadium alloy may be used, and these alloys have a magnetic saturation of about 24 kilogauss. In addition, the filler pieces 50 may include a core 51 of a high magnetic permeability material, and a low friction material 52 on one or both sides of the core 51. The low friction material 52 facilitates insertion of the filler pieces 50 into the air gap 40, as well as facilitating removal of the filler pieces from the air gap. For example, the low friction material 52 may be comprised of polytetrafluoroethylene (PTFE), or even roller or spherical bearings, or any other suitable low or reduced friction material. The filler pieces 50 may extend the axial length of the rotor, the axial length of the permanent magnets 130, or be of any suitable length as desired in the specific application.

Figure 5:
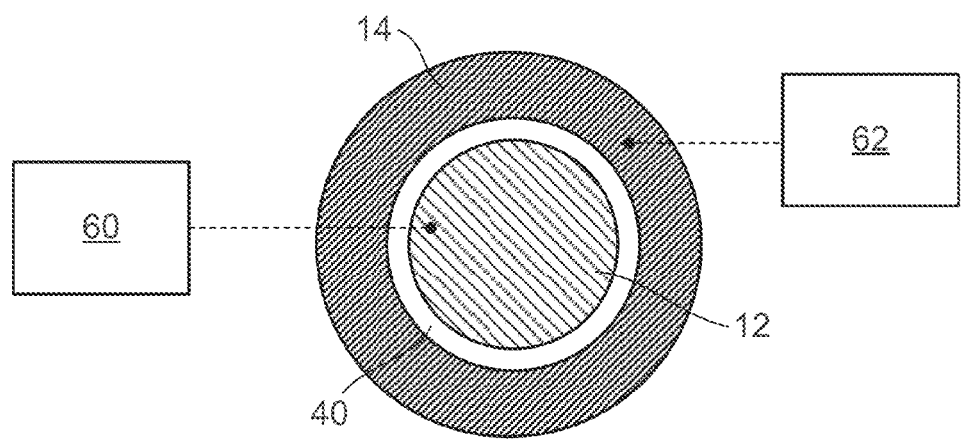
FIG. 5 illustrates a simplified schematic of the rotor and stator excitation systems.

In step 320, a voltage/current is applied to the rotor's excitation windings 24 or the stator windings 26. FIG. 5 illustrates a simplified schematic of the rotor and stator excitation systems. A rotor excitation system 60 applies a voltage/current to the rotor excitation windings 24. Typically, this voltage/current is of a sufficient magnitude (i.e., the normal excitation voltage and/or normal excitation current) to generate a suitable magnetic field for power generation. However, in the method of the present invention the magnetizing/degaussing voltage/current is preferably about two to about five times greater than the normal excitation voltage/current. The magnetizing/degaussing voltage/current could be below this range, but the time required to obtain the magnetization or degaussing will be increased. In addition, the magnetizing/degaussing voltage/current could be more than three times the normal excitation voltage/current, but the machine components may be undesirably affected unless they are capable of handling these increased levels of voltage and current.

In step 330, the voltage/current applied to the rotor's excitation windings 24 or the stator windings 26 is maintained for a time period sufficient to magnetize or degauss the permanent magnets 130. The time period may be limited to about five to about fifteen seconds, or any suitable short duration time period. The time period is limited because the voltage/current is greater than the normal excitation voltage or stator winding voltage. If the magnetizing/degaussing voltage/current was maintained for extended periods of time, then damage to the machine could occur. Most generators or motors can handle the increased levels of voltage/current for brief periods without experiencing any damage, and a time period of about two to about fifteen seconds, or any subranges therebetween should be tolerated by most generators and motors.

In step 340, the permanent magnets 130 in rotor 12 may be magnetized. For example, a positive voltage/current may be used to magnetize the permanent magnets 130, and a negative voltage/current may be used to degauss the permanent magnets 130, or vice-versa. An advantage provided by the present invention is that the rotor's permanent magnets 30, 130 may be magnetized and/or degaussed with the rotor 12 in-situ, or with the rotor 12 located inside the stator 14. This makes handling the rotor 12 much safer and easier as it can be transported and handled in a degaussed or un-magnetized state. In addition, the cost for manufacturing and handling the rotor is greatly reduced due to the fact that special rooms (without any magnetic materials) and equipment are no longer required.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for in-situ magnetization of a generator rotor, the generator having a stator and the rotor is located inside the stator, an air gap is formed between an outer radial portion of the rotor and an inner radial portion of the stator, the rotor having a plurality of excitation windings and a plurality of permanent magnets, the method comprising:
   applying a current to the excitation windings, the current is greater than a normal excitation current;
   maintaining the current for a time period sufficient to magnetize the permanent magnets; and
   wherein the magnetization of the permanent magnets occurs on the rotor in-situ and while the rotor is inside the stator.

2. The method of claim 1, the current being about two to about five times greater than the normal excitation current.

3. The method of claim 2, the time period being about five to about fifteen seconds.

4. The method of claim 3, further comprising:
   placing a plurality of filler pieces in the air gap, the filler pieces configured to reduce reluctance and to permit increased magnetic flux densities.

5. The method of claim 4, wherein the filler pieces are comprised of a cobalt-iron alloy or an iron-cobalt-vanadium alloy.

6. The method of claim 4, wherein the filler pieces include a low friction material to facilitate insertion into the air gap and removal from the air gap.

7. The method of claim 6, wherein the low friction material comprises polytetrafluoroethylene (PTFE).

8. A method for in-situ magnetization of a generator rotor, the generator having a stator and the rotor is located inside the stator, the stator having a plurality of stator windings, an air gap is formed between an outer radial portion of the rotor and an inner radial portion of the stator, the rotor having a plurality of excitation windings and a plurality of permanent magnets, the method comprising:
   applying a current to the stator windings, the current is greater than a normal stator winding current;
   maintaining the current for a time period sufficient to magnetize the permanent magnets in the rotor; and wherein the magnetization of the permanent magnets occurs on the rotor in-situ and while the rotor is inside the stator.

9. The method of claim 8, the current being about two to about five times greater than the normal stator winding current.

10. The method of claim 9, the time period being about five to about fifteen seconds.

11. The method of claim 10, further comprising:
placing a plurality of filler pieces in the air gap, the filler pieces configured to reduce reluctance and to permit increased magnetic flux densities.

12. The method of claim 11, wherein the filler pieces include a low friction material to facilitate insertion into the air gap and removal from the air gap.

13. The method of claim 12, wherein the low friction material comprises at least one of:
bearings or polytetrafluoroethylene (PTFE).

14. A method for in-situ magnetization or degaussing of a generator rotor, the generator having a stator and the rotor is located inside the stator, the stator having a plurality of stator windings, an air gap is formed between an outer radial portion of the rotor and an inner radial portion of the stator, the rotor having a plurality of excitation windings and a plurality of permanent magnets, the method comprising:
applying a voltage/current to a plurality of windings, an absolute value of the voltage/current being greater than a normal winding voltage/current;
maintaining the voltage/current for a time period sufficient to magnetize or degauss the permanent magnets in the rotor; and
wherein the magnetization or degaussing of the permanent magnets occurs on the rotor in-situ and while the rotor is inside the stator.

15. The method of claim 14, wherein the plurality of windings are one of:
the plurality of excitation windings or the stator windings.

16. The method of claim 15, wherein the plurality of permanent magnets are magnetized, and the applying step applies a positive voltage/current to the plurality of windings.

17. The method of claim 15, wherein the plurality of permanent magnets are degaussed, and the applying step applies a negative voltage/current to the plurality of windings.

18. The method of claim 15, wherein the absolute value of the voltage/current is about two to about five times greater than a normal winding voltage/current.

19. The method of claim 18, the time period being about five to about fifteen seconds.

20. The method of claim 15, further comprising:
placing a plurality of filler pieces in the air gap, the filler pieces configured to reduce reluctance and to permit increased magnetic flux densities; and
wherein the filler pieces include a low friction material to facilitate insertion into the air gap and removal from the air gap.

* * * * *